United States Patent
Schmidt et al.

(10) Patent No.: US 11,642,940 B2
(45) Date of Patent: May 9, 2023

(54) SYSTEM AND METHOD FOR MALODOR DETECTION AND REMEDIATION

(71) Applicant: GM Cruise Holdings LLC, San Francisco, CA (US)

(72) Inventors: Michael Frank Schmidt, Scottsdale, AZ (US); Samuel Harrison Glidden, Phoenix, AZ (US); Chase Brian Kaufman, Fountain Hills, AZ (US); Kyle Vogt, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 575 days.

(21) Appl. No.: 16/225,683

(22) Filed: Dec. 19, 2018

(65) Prior Publication Data
US 2020/0198444 A1 Jun. 25, 2020

(51) Int. Cl.
*B60H 3/00* (2006.01)
*B60H 1/00* (2006.01)
(Continued)

(52) U.S. Cl.
CPC ........... *B60H 3/0035* (2013.01); *B60H 1/008* (2013.01); *B60H 1/00792* (2013.01);
(Continued)

(58) Field of Classification Search
CPC .. B60H 3/0035; B60H 1/00792; B60H 1/008; B60H 3/0085; B60W 2050/0002;
(Continued)

(56) References Cited

U.S. PATENT DOCUMENTS 5,333,703 A * 8/1994 James ................... B60K 28/10
 180/271
6,672,954 B2 1/2004 Shtanko
(Continued)

FOREIGN PATENT DOCUMENTS

DE 102018203858 A1 * 9/2019 ......... B60H 1/00742
EP 1422089 A2 * 5/2004 ............. B60H 1/008
(Continued)

OTHER PUBLICATIONS

Lafound, Adrien, "List of Common Volatile Organic Compounds (VOCs)", Retrieved Date: Feb. 8, 2023, Retrieved At: <<https://foobot.io/guides/list-of-common-volatile-organic-compounds.php>>, 5 pages.
(Continued)

*Primary Examiner* — Aniss Chad
*Assistant Examiner* — Jennifer M Anda
(74) *Attorney, Agent, or Firm* — Calfee, Halter & Griswold LLP

(57) ABSTRACT

Described herein is a system and method for detecting malodor within a cabin of an autonomous vehicle, wherein initiation of a remediation system and/or dispatch of the autonomous vehicle to a service hub for mitigating the malodor is based upon sensor signals that monitor the cabin of the autonomous vehicle. The remediation system can include devices such as an HVAC system or a window, which are operated to reduce the concentration of airborne molecules in the cabin of the autonomous vehicle when the concentration of airborne molecules exceeds an air quality threshold. A dispatch protocol may be initiated to dispatch the autonomous vehicle to a service hub when the malodor is associated with certain predefined incidents or when remediation fails to reduce the concentration of airborne molecules below the air quality threshold.

20 Claims, 8 Drawing Sheets

(51) Int. Cl.
  *B60W 10/30* (2006.01)
  *G05D 1/00* (2006.01)
  *B60W 50/14* (2020.01)
  *B60W 50/00* (2006.01)

(52) U.S. Cl.
  CPC ........... *B60H 3/0085* (2013.01); *B60W 10/30* (2013.01); *B60W 50/14* (2013.01); *B60W 2050/0002* (2013.01); *B60W 2050/0005* (2013.01); *B60W 2050/143* (2013.01); *G05D 1/00* (2013.01); *G05D 1/0088* (2013.01)

(58) Field of Classification Search
  CPC ........... B60W 2050/143; B60W 50/14; B60W 10/30; B60W 2050/0005; G05D 1/00; G05D 1/0088
  See application file for complete search history.

(56) References Cited

U.S. PATENT DOCUMENTS

| | | | |
|---|---|---|---|
| 6,688,963 | B2 | 2/2004 | Boiger |
| 6,758,739 | B1 | 7/2004 | Sangwan et al. |
| 9,676,250 | B2 | 6/2017 | Weast et al. |
| 9,682,609 | B1* | 6/2017 | Dudar ................ B60H 1/00785 |
| 9,682,610 | B2 | 6/2017 | Duan et al. |
| 9,889,719 | B2 | 2/2018 | Isert et al. |
| 10,295,457 | B1* | 5/2019 | Ocheltree ............ G01N 21/274 |
| 10,471,804 | B1* | 11/2019 | Wengreen .......... B60H 1/00828 |
| 11,034,212 | B2* | 6/2021 | Li ............................ B60H 3/06 |
| 2007/0243808 | A1* | 10/2007 | Mathur ............... B60H 1/00764 454/75 |
| 2012/0264361 | A1* | 10/2012 | Scheer ................ B60H 3/0035 454/75 |
| 2016/0280160 | A1* | 9/2016 | MacNeille ............. G05B 15/02 |
| 2016/0318368 | A1* | 11/2016 | Alger .................. G01C 21/3453 |
| 2017/0015177 | A1* | 1/2017 | Isert .................... B60H 1/00771 |
| 2017/0080900 | A1* | 3/2017 | Huennekens .......... G08B 21/00 |
| 2018/0057013 | A1* | 3/2018 | Mullett ................... B60H 1/267 |
| 2018/0319406 | A1 | 11/2018 | Dudar |
| 2019/0061466 | A1* | 2/2019 | MacNeille ......... B60H 1/00821 |
| 2019/0066249 | A1* | 2/2019 | Decaluwe ............. G06Q 50/30 |
| 2019/0077217 | A1* | 3/2019 | Yu ........................ B60H 1/0073 |
| 2019/0283525 | A1* | 9/2019 | Dhake ................ B60H 1/00742 |
| 2020/0001681 | A1* | 1/2020 | Duan .................. B60H 1/00771 |
| 2020/0043030 | A1* | 2/2020 | Mangal ................ G06Q 30/0208 |
| 2020/0180387 | A1* | 6/2020 | Sarma ................ B60H 1/00778 |
| 2020/0292337 | A1 | 9/2020 | Starns |
| 2021/0188051 | A1* | 6/2021 | MacNeille ........... B60H 3/0085 |
| 2021/0221388 | A1* | 7/2021 | Zemek .................. G07C 5/008 |

FOREIGN PATENT DOCUMENTS

| | | | | |
|---|---|---|---|---|
| JP | 2005047418 | A * | 2/2005 | ............. B60H 1/008 |
| WO | WO-2017121945 | A1 * | 7/2017 | ......... B60H 1/00978 |

OTHER PUBLICATIONS

"Office Action for U.S. Appl. No. 17/487,498", dated Feb. 14, 2023, 32 pages.

* cited by examiner

SYSTEM AND METHOD FOR MALODOR DETECTION AND REMEDIATION

BACKGROUND

An autonomous vehicle is a motorized vehicle that can operate without a human driver. An exemplary autonomous vehicle includes a plurality of sensor systems such as, but not limited to, a camera sensor system, a lidar sensor system, a radar sensor system, amongst others, wherein the autonomous vehicle is controlled based upon sensor signals output by the sensor systems. The sensor signals are typically processed by a computing system having a processor that executes instructions to control a mechanical system of the autonomous vehicle such as a vehicle propulsion system, a braking system, or a steering system. Other types of sensor systems included in the autonomous vehicle are configured to monitor operations of the autonomous vehicle and can include sensors that generate outputs in accordance with passenger comfort metrics. For example, a temperature sensor may monitor a cabin temperature of the autonomous vehicle to initiate temperature adjustments to maintain a desirable temperature.

Autonomous vehicles serving as rideshares can be particularly suspect to passenger discomfort due to lack of a human driver that might otherwise be able to address a passenger's concern. An exemplary passenger comfort metric that may have an impact on passenger comfort level is lingering malodor within the cabin of the autonomous vehicle. Unpleasant scents are commonly associated with vehicle cleanliness and can be identified by passengers as a condition that affects their comfort level during the course of a rideshare. Furthermore, even in instances where a source of the malodor (e.g., sweaty clothes, trash, food, pets, etc.) is removed from the autonomous vehicle, the malodor may remain stagnant within the cabin of the autonomous vehicle for a further amount of time, particularly if the heating, ventilating, and air conditioning (HVAC) system is powered off while the autonomous vehicle is vacant, for example, to reduce power consumption and improve the range of the autonomous vehicle.

SUMMARY

The following is a brief summary of subject matter that is described in greater detail herein. This summary is not intended to be limiting as to the scope of the claims.

Described herein are various technologies pertaining to malodor detection and remediation for an autonomous vehicle. With more specificity, described herein is an air quality sensor system configured to output a sensor signal indicative of a type and a concentration of airborne molecules in a cabin of the autonomous vehicle, wherein the type and the concentration may be indicative of a malodor. A computing system of the autonomous vehicle can initiate or control a remediation system configured to alter an air quality in the cabin of the autonomous vehicle and/or dispatch the autonomous vehicle to a service hub for mitigating the malodor. The computing system includes memory that stores instructions that, when executed by the processor, cause the processor to perform one or more actions. Specifically, the type and concentration of airborne molecules in the cabin of the autonomous vehicle can be determined by the computing system based upon the sensor signal from the air quality sensor system. The concentration of airborne molecules is compared to the air quality threshold for the type of airborne molecules. The remediation system is controlled to alter the air quality in the cabin of the autonomous vehicle when the concentration of airborne molecules exceeds the air quality threshold. Alternatively, when the concentration of airborne molecules is determined to be below the air quality threshold, operation of the remediation system is not needed (e.g., changes in operation of the remediation system need not be made, the remediation system need not be initiated).

Moreover, the autonomous vehicle can be controlled to take different actions depending on the type of malodor detected within the cabin of the autonomous vehicle. The detected type of molecule may correspond to a particular source of malodor (e.g., vomit, trash, abandoned items, etc.), wherein the particular source of malodor is selected to prompt an external remediation technique, such as a cleaning regimen, to mitigate the type of molecule from the cabin of the autonomous vehicle. Accordingly, detection of a first type of molecule in the cabin of the autonomous vehicle may cause a first type of response (e.g., initiating the HVAC system or operating a window), while detecting a second type of molecule may cause a second type of response, such as controlling a mechanical system of the autonomous vehicle to navigate the autonomous vehicle to a service hub where the external remediation technique is performed.

The autonomous vehicle includes at least one air quality sensor system that detects one or more types of airborne molecules within the cabin of the autonomous vehicle that can cause a malodor. The air quality sensor system can include an array of sensors. According to an example, the array of sensors may include a volatile organic compound (VOC) sensor, a hydrogen sulfide ($H_2S$) sensor, amongst others. Incorporating an array of sensors in the cabin of the autonomous vehicle is advantageous, for example, because a plurality of VOC sensors can be configured to detect a plurality of different types of molecular compounds/organic structures to identify a plurality of different sources of malodor. Accordingly, the remediation system may be activated when a concentration of airborne molecules indicative of certain malodors exceeds an air quality threshold. The air quality threshold may be dependent upon a type of detected malodor, wherein different types of malodors could trigger activation of the remediation system at different air quality thresholds.

The remediation system can include, but is not limited to, an operable window, an HVAC system, or an air freshener (e.g., a device that releases a scented spray in response to a detected malodor). The remediation system may likewise include separate heating, ventilating, and air condition systems, or combinations thereof, to provide similar functionality to that of a single HVAC system. Further, some air quality sensors configured to detect malodors may be retrofitted to autonomous vehicles that are unequipped with such sensors to thereby incorporate or improve the remediation system.

A computing system included in the autonomous vehicle can be configured to optimize power consumption by determining a timeframe of operation for the remediation system based upon the concentration of airborne molecules and an anticipated timeframe of cabin vacancy. For instance, the remediation system may be operated to mitigate the concentration of airborne molecules while the cabin of the autonomous vehicle is vacant. However, the timeframe of operation for the remediation system could likewise be limited by an anticipated remaining time until a next passenger is picked up, so that a temperature control system can ensure the cabin is at a suitable temperature upon arrival at a destination location.

In addition to power consumption, mitigating the concentration of airborne molecules may be further balanced against the timeframe of operation for the remediation system by accounting for variables such as cabin size, cabin temperature, cabin ventilation, anticipated remaining time of occupancy, distance of the air quality sensor system from a source of airborne molecules, molecular combinations detected by the air quality sensor system, and other similar criteria. In other instances, the remediation system may be operated during passenger transit based upon input from a passenger that a malodor is present in the cabin of the autonomous vehicle and/or that a malodor was not sufficiently mitigated prior to arrival of the autonomous vehicle.

When the remediation system does not reduce the concentration of airborne molecules below the air quality threshold, the autonomous vehicle can be controlled to navigated to a service hub where an external remediation technique is performed. External remediation techniques can include, but are not limited to, cleaning routines, sanitation, trash/item removal, maintenance, interior refurbishing, etc. The service hub may be located, for instance, at an owner-operated facility, a partnered service facility (e.g., a rental car company or full-service station), and/or a location designated by an affiliated individual such as an independent contractor or remote employee. In an example, the affiliated individual may receive and accept a cleaning request prompted through a mobile application similar to requests received and accepted by drivers of non-autonomous rideshare vehicles. Alternatively, owner-operated facilities and partnered service facilities may receive alerts through a computer application (e.g., a dispatch tool) that indicates an autonomous vehicle is in route to the facility. The alert can also indicate a likely source of malodor based upon molecular compound sensor signals to recommend a remediation technique at the service hub. The source of the malodor can be confirmed by a camera sensor system that generates an image sensor signal which captures an image within the cabin of the autonomous vehicle. Confirmation of the source of malodor from the image sensor signal may be performed by a computing system or through manual inspection.

Detection of airborne molecules indicative of certain predefined incidents that correspond to malodors caused by at least one of vomit, urine, excrement, body odor, mildew, debris, trash, or decomposing food may prompt an external remediation technique to mitigate a malodor from the autonomous vehicle regardless of the concentration of airborne molecules in the cabin. According to an example, the computing system of the autonomous vehicle can be configured to provide cabin tidiness metrics to a server computing system that are based upon a condition of the autonomous vehicle following passenger transit. The server computing system can then generate a rider rating for a passenger based upon the tidiness metrics and store the rider rating in a database to preserve passenger travel history for future reference. In an alternative example, the predefined incident that initiates remediation at a service hub may include the cabin of the autonomous vehicle exceeding a threshold timeframe since an external remediation technique was last performed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
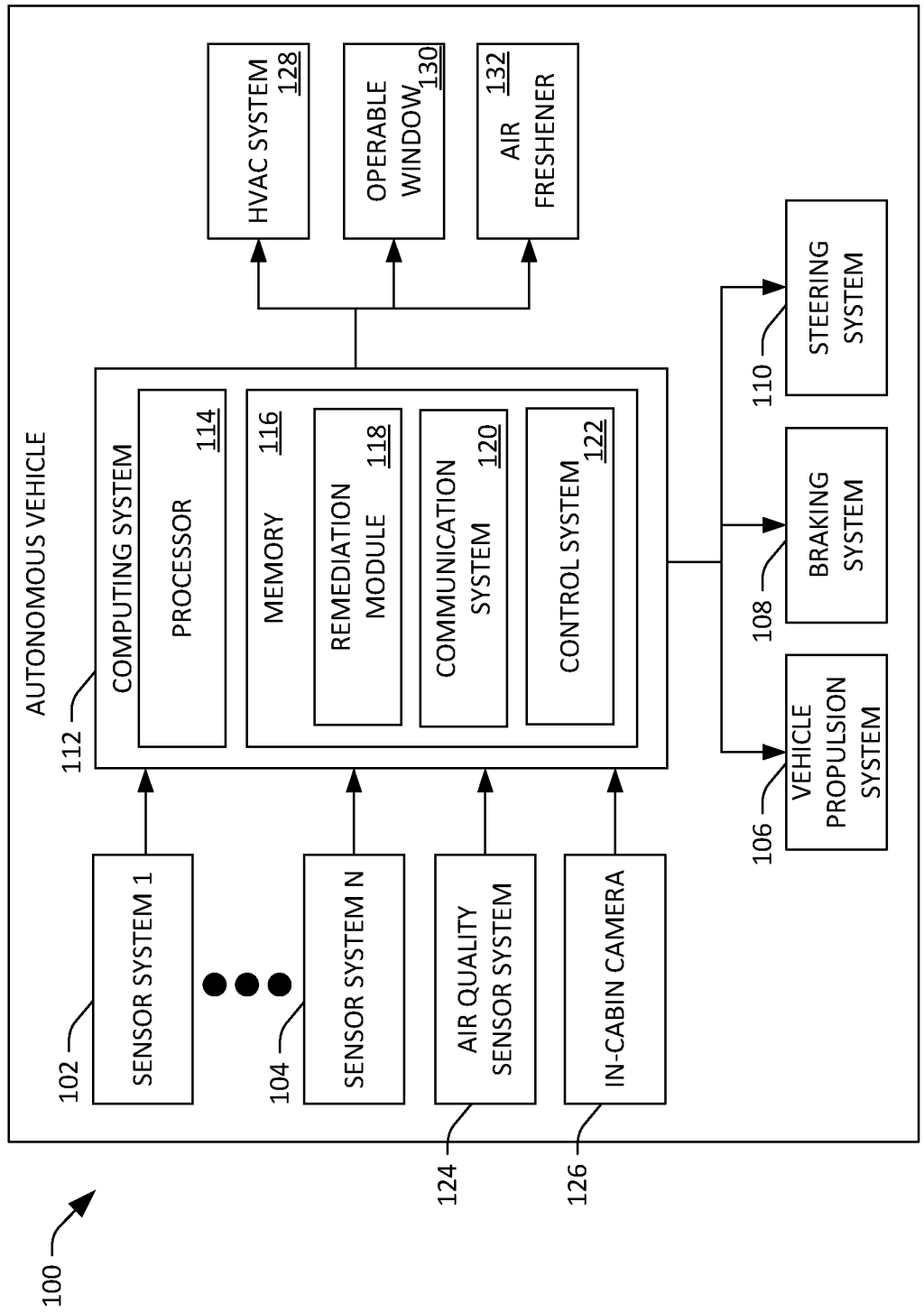
FIG. 1 illustrates an exemplary autonomous vehicle.

Various technologies pertaining to malodor detection and remediation is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without a human driver based upon sensor signals output by sensor systems 102-104 of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a camera sensor system and the Nth sensor system 104 may be a lidar sensor system. Other exemplary sensor systems include radar sensor systems, global positioning system (GPS) sensor systems, inertial measurement units (IMU), infrared sensor systems, laser sensor systems, sonar sensor systems, and the like. Some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

In addition to the sensor systems 102-104 that sense the environment around the autonomous vehicle 100, an air quality sensor system 124 and an in-cabin camera 126 are included in the autonomous vehicle 100 to sense the interior environment within the cabin of the autonomous vehicle 100. The air quality sensor system 124 can include a VOC sensor, an $H_2S$ sensor, amongst others, to detect a plurality of different types of airborne molecules that correspond to a plurality of different sources of malodor. For instance, identification of blue cheese could be determined by detection of $C_7H_{14}O$ or $C_9H_{18}O$, fish by detection of $C_3H_9N$, urine by detection of $NH_3$, sweaty clothing by detection of $C_7H_{16}OS$, etc. The in-cabin camera 126 may be activated to generate an image or video sensor signal that captures the cabin of the autonomous vehicle 100 to confirm the source of malodor detected by the air quality sensor system 124, for example, by computerized object identification algorithms and/or through manual verifications from the image or video sensor signal.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may include an electric motor, an internal combustion engine, or both. The braking system 108 can include an engine brake pads, actuators, and/or any other suitable componentry that is configured to assist in decelerating the autonomous vehicle 100. The steering system 110 includes suitable componentry that is configured to control the direction of movement of the autonomous vehicle 100 during propulsion.

The autonomous vehicle 100 additionally comprises a computing system 112 that is in communication with the sensor systems 102-104, the air quality sensor system 124, the in-cabin camera 126, and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Memory 116 further comprises a remediation module 118, a communication system 120, and a control system 122. The remediation module 118 includes instructions that are executed by the processor 114 for controlling operation of a remediation device, such as an HVAC system 128, an operable window 130, or an air freshener 132. The remediation module 118 can manipulate the remediation devices 128-132, for example, by switching the HVAC system 128 on and off, adjusting a position of the operable window 130, and controlling scented releases by the air freshener 132. Further the remediation module 118 can control operating parameters of the remediation devices 128-132, such as concentration of the scented releases by the air freshener 132, the rate at which the position of the operable window 130 is manipulated, and fan speed, temperature outputs, and air recirculation or ventilation by the HVAC system 128. The remediation module 118 and the remediation devices 128-132 cooperate with one or more controllers to comprise the remediation system.

The remediation module 118 may be configured to optimize power consumption by the remediation devices 128-132 (e.g., the HVAC system 128) to improve the range of the autonomous vehicle 100. An optimized timeframe of operation for the remediation devices 128-132 can be determined based upon metrics such as power consumed by the type of remediation device, strength/concentration of malodor, air quality threshold, length of cabin vacancy, etc. An output of the remediation module 118 is generated based upon the optimized timeframe of operation to the control the remediation devices 128-132 in accordance therewith.

The control system 122 is configured to control operation of the vehicle propulsion system 106, the braking system 108, and the steering system 110. The control system 122 receives sensor signals from the sensor systems 102-104 in addition to outputs from individual modules incorporated in memory 116. The communication system 120 may be configured as an independent module of memory 116 or included in the autonomous vehicle 100 as a separate system that transmits and receives signals from/to other systems. The communication system 120 is configured to transmit information wirelessly to external networks and other receivers, for example, through an antenna array that provides personal long-term evolution (LTE) communication. For example, the communication system 120 can enable the autonomous vehicle 100 to wirelessly communicate with a server computing system (e.g., to exchange messages pertaining to scheduling the autonomous vehicle 100 at a service hub, rider rating information, etc.).

Figure 2:
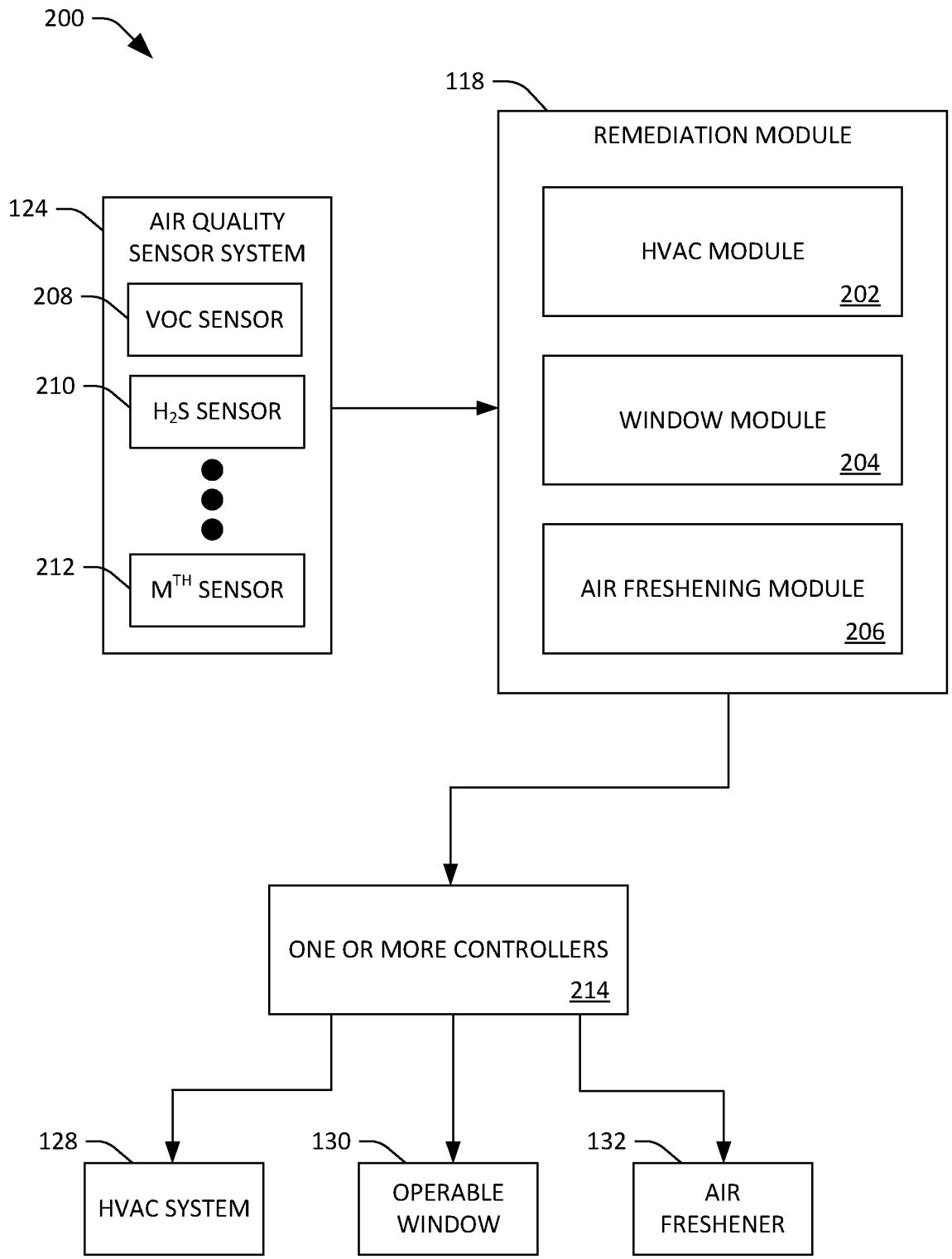
FIG. 2 illustrates an exemplary remediation system.

With reference now to FIG. 2, an exemplary remediation system 200 comprising the air quality sensor system 124, the remediation module 118, the one or more controllers 214, and the remediation devices 128-132 (the HVAC system 128, the operable window 130, and the air freshener 132) is illustrated. The air quality sensor system 124 can include an array of sensors 208-212 (e.g., a first sensor through an Mth sensor 212). The array of sensors 208-212 can be of different types and configured to detect a plurality of malodors with the cabin of the autonomous vehicle. For example, the first sensor in the array may be a VOC sensor 208 and a second sensor in the array may be an $H_2S$ sensor 210. An output of the air quality sensor system 124 is provided to the remediation module 118.

The remediation module 118 can include separate remediation device modules including, but not limited to, an HVAC module 202, a window module 204, and an air freshening module 206 having computer-executable instructions for controlling respective operations of the HVAC system 128, the operable window 130, and the air freshener 132 by the one or more controllers 214. For example, the window module 204 can include instructions for controlling a number of operable windows to open, how long an operable window should remain open, how far the operable window should be rolled down, etc., based upon considerations such as exterior weather conditions, vehicle speed, the concentration of airborne molecules in the cabin, detected combinations of molecules/organic structures, amongst others. The window module 204 can likewise control operation of the operable window 130 based upon an anticipated remaining time of occupancy by passengers to delay remediation by the operable window 130 until the cabin is vacant.

In an exemplary embodiment, operations of the HVAC system 128 can be controlled by separate modules that include separate instructions for heating, ventilating, and the air conditioning. The HVAC module 202 of remediation module 118 can include instructions for controlling the HVAC system 128 based upon requirements dictated by cabin size, cabin temperature, and/or cabin ventilation. The HVAC module 202 can likewise control the HVAC system 128 based upon an anticipated remaining time of occupancy by passengers. Alternatively, the remediation devices 128-132 can be operated during passenger transit based upon an input/request from a passenger.

The air freshening module 206 includes instructions for controlling the air freshener 132 (e.g., a device that release a scented spray) to remediate malodor within the cabin of the autonomous vehicle. The air freshening module 206 can include instructions for controlling operation of the air freshener 132 based upon the concentration of airborne molecules detected in the cabin of the autonomous vehicle and/or the distance of the air quality sensor system 124 from a source of the airborne molecules. For instance, remedial measures by the air freshener 132 may need to be more robust when a source of malodor is farther away from the air quality sensor system 124 because the concentration of airborne molecules at the air quality sensor system 124 may be weaker than that perceived by a nearby passenger. The distance to the source of malodor can be identified by a camera sensor system that captures an image of the cabin of the autonomous vehicle. An output from remediation module 118 is provided to the one or more controllers 214 to operate the remediation devices 128-132 in accordance with the executed instructions.

Figure 3:
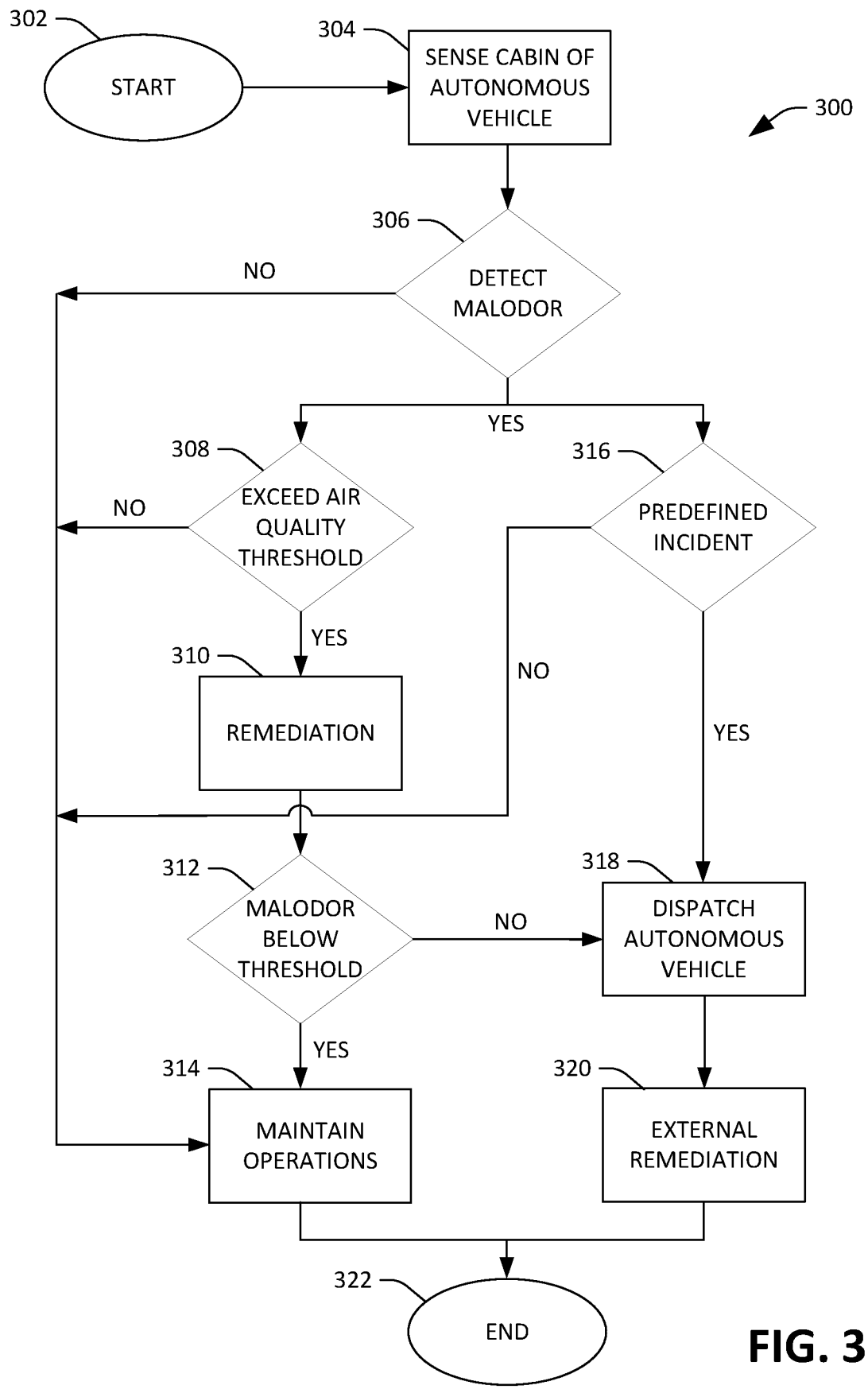
FIG. 3 illustrates an exemplary process diagram for malodor detection and remediation.

With reference now to FIG. 3, an exemplary process diagram 300 for malodor detection and remediation is illustrated. The process starts at 302, and at 304 at least one air quality sensor system senses a cabin of the autonomous vehicle. The at least one air quality sensor system can be configured to detect a certain type of molecule or include an array of sensors (e.g., a VOC sensor and an $H_2S$ sensor) configured to detect a plurality of molecule types. A sensor signal generated by the at least one air quality sensor system is provided, for example, to a computing system where, at 306, a determination is made regarding whether a malodor is detected in the cabin of the autonomous vehicle. If no malodor is detected, operations of the autonomous vehicle are maintained at 314 without initiating remedial measures and the process completes at 322. Otherwise, the computing system determines at 308 whether an air quality threshold is exceeded by the detected malodor and at 316 whether the detected malodor is indicative of a predefined incident. This provides two potential paths for initiating remedial measures.

First, if the air quality threshold is not exceeded, operations of the autonomous vehicle are maintained at 314 and the process completes at 322 without initiating remedial measures through the first path. In contrast, a malodor/concentration of airborne molecules that does exceed the air quality threshold at 308 subjects the cabin of the autonomous vehicle to remediation 310. Remediation 310 can include, but is not limited to, operation of a window, HVAC system, and/or air freshener to reduce the concentration of airborne molecules in the cabin of the autonomous vehicle. Following remediation 310, the computing system determines at 312 whether the malodor is below the air quality threshold. That is, whether remediation 310 has reduced the concentration of airborne molecules below a threshold that is defined for the type of detected malodor. If so, operations of the autonomous vehicle are maintained at 314 and the process to complete at 322. Otherwise, the autonomous vehicle is dispatched at 318 to a service hub for further inspection where additional remedial measures can be performed.

The second path includes determining at 316 whether the malodor is indicative of a predefined incident. If the malodor is not indicative of a predefined incident, operations of the autonomous vehicle are maintained at 314 and the process completes at 322 without initiating remedial measures through the second path. Predefined incidents may include matters that involve vomit, urine, excrement, body odors, mildew, debris, trash, decomposing food, and any other situation having highly repugnant malodors. In an exemplary embodiment, the predefined incident may further include exceeding a threshold timeframe since the autonomous vehicle was last cleaned, sanitized, maintained, or refurbished by an external source. If the detected malodor does indicate the occurrence of a predefined incident, the autonomous vehicle is dispatched at 318 to a service hub for further inspection. Dispatch of the autonomous vehicle at 318 based upon a predefined incident can occur regardless of malodor concentration and air quality threshold.

Upon initiation of a protocol at 318 to dispatch the autonomous vehicle, the computing system executes instructions to navigate the autonomous vehicle to a service hub. The protocol to dispatch the autonomous vehicle at 318 may be initiated by either detection of a predefined incident 316 or remediation 310 that fails, at 312, to reduce the malodor below the air quality threshold. At the service hub, external remediation 320 can be performed to mitigate the malodor or concentrations thereof from the cabin of the autonomous vehicle. External remediation 320 can include, but is not limited to, cleaning routines, sanitation, trash/item removal, maintenance, interior refurbishing, etc. Following external remediation 320, the process is completed at 322 and may again be restarted at 302 for subsequent detection and remediation of malodors.

Figure 4:
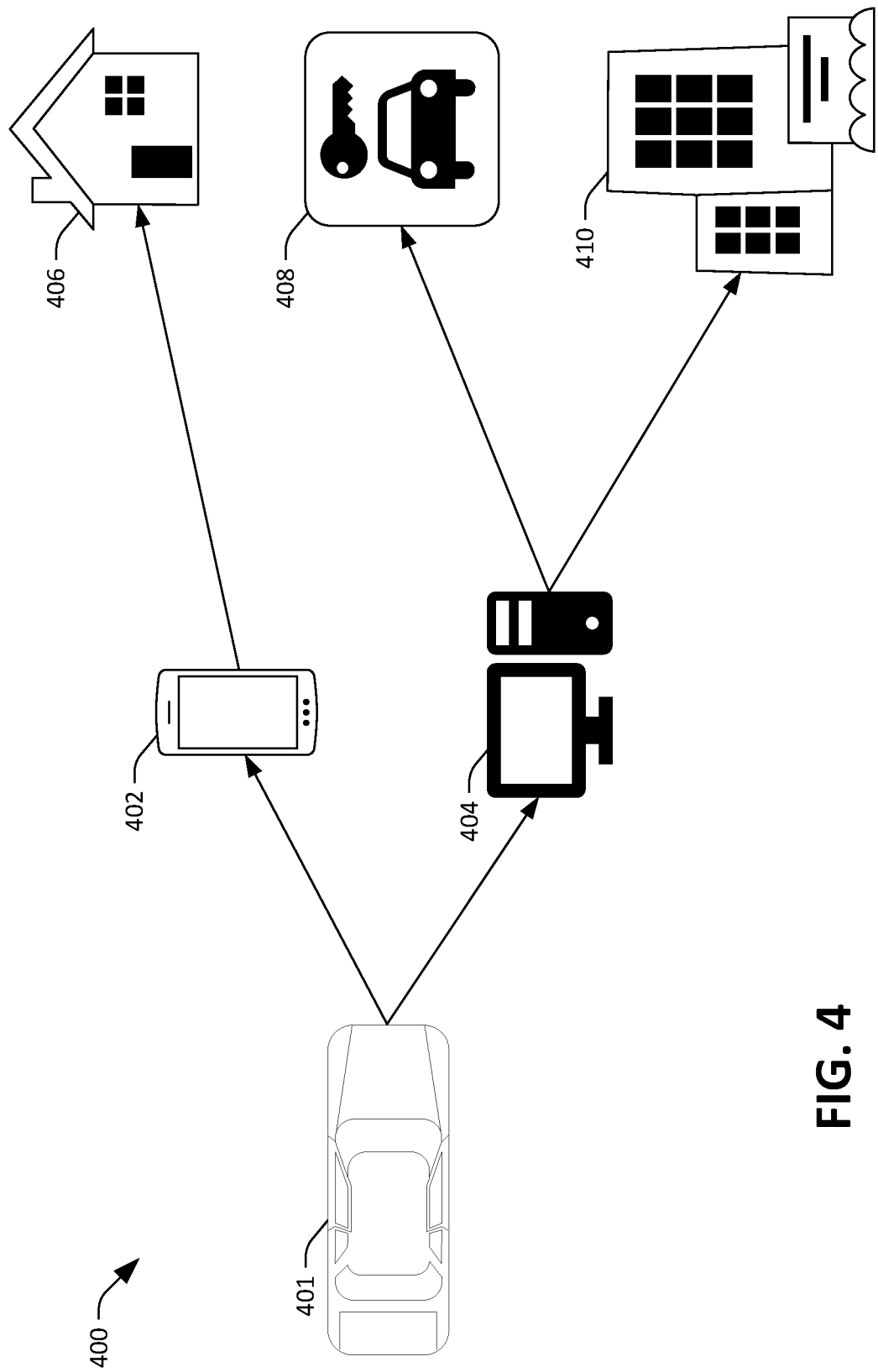
FIG. 4 is a flow diagram illustrating an exemplary process for dispatching an autonomous vehicle to a service hub.

With reference now to FIG. 4, an exemplary flow diagram 400 for dispatching an autonomous vehicle 401 (e.g., the autonomous vehicle 100) to a service hub 406-410 is illustrated. A computing system incorporated in the autonomous vehicle 401 initiates a dispatch protocol based upon detection of a predefined incident selected to prompt an external remediation technique through at least one of a mobile computing device 402 or a remote computer 404. For instance, the mobile computing device 402 and the remote computer 404 can each receive autonomous vehicle dispatch information through respective mobile and computer interfaces, applications, routines, and the like. The dispatch information may include vehicle information, an estimated time of arrival, a type of malodor, an abandoned source of malodor, an expected amount of service time, recommended remedial measures, and other information related to the dispatch.

The mobile computing device 402 may be a cell phone, smart phone, tablet, etc., which can be operated by an individual affiliated with an external remediation service (e.g., cleaning and sanitation services, trash and item removal, maintenance, and/or interior refurbishing services). The affiliated individual may be prompted by a service request received through the mobile application, wherein the affiliated individual can accept or deny the service request via the mobile computing device 402, similar to mobile rideshare requests received by drivers of non-autonomous rideshare vehicles. If the service request is accepted, the autonomous vehicle 401 navigates to a service hub associated with the affiliated individual. The service hub can be any designated location 406 chosen by the affiliated individual (e.g., a personal residence, a car wash, a parking lot, etc.) that is suitable for performing external remediation services. The designated location 406 for the service hub can also be a dynamic location that is based upon a current location of the mobile computing device 402 at the time the service request is accepted. Tracking a location of the mobile computing device 402 can facilitate navigation of the autonomous vehicle 401 to the nearest affiliated individual.

The remote computer 404 can be arranged on a network maintained by a partnered facility 408 or an owner-operated facility 410. The partnered facility 408 can be a rental car company, a full-service gas station, a service garage, or other business entity that provides external remediation services for the autonomous vehicle 401. The partnered facility 408 may be prompted with a service request received through a computer application on the remote computer 404, which can be accepted or denied by the partnered facility 408. The service request may indicate that the autonomous vehicle 401 is in route to the partnered facility 408 and will continue navigating thereto unless the service request is affirmatively denied by the partnered facility 408 prior to arrival.

The owner-operated facility 410 (e.g., a service/diagnostics garage, manufacturing facility, warehouse, etc.) can similarly receive service requests through a computer application executed on a remote computer 404. It is to be understood that none of the service hubs 406-410 are limited to receiving service information through a particular type of device and that each service hub 406-410 is able to receive information through any of the mobile computing device 402, the remote computer 404, and other devices. The computer application executed by the remote computer 404 can include a dispatch tool that provides the dispatch information, such as recommended remediation techniques. Following passenger transit, a rider rating based upon the condition of the autonomous vehicle 401 can be input at the service hubs 406-410 or generated automatically by the computing system of the autonomous vehicle 401 according to sensors signals (e.g., camera sensor signals, VOC sensor signals, $H_2S$ sensor signals, etc.). The rider rating can be communicated to an external network and/or stored in a database for future reference.

Figure 5:
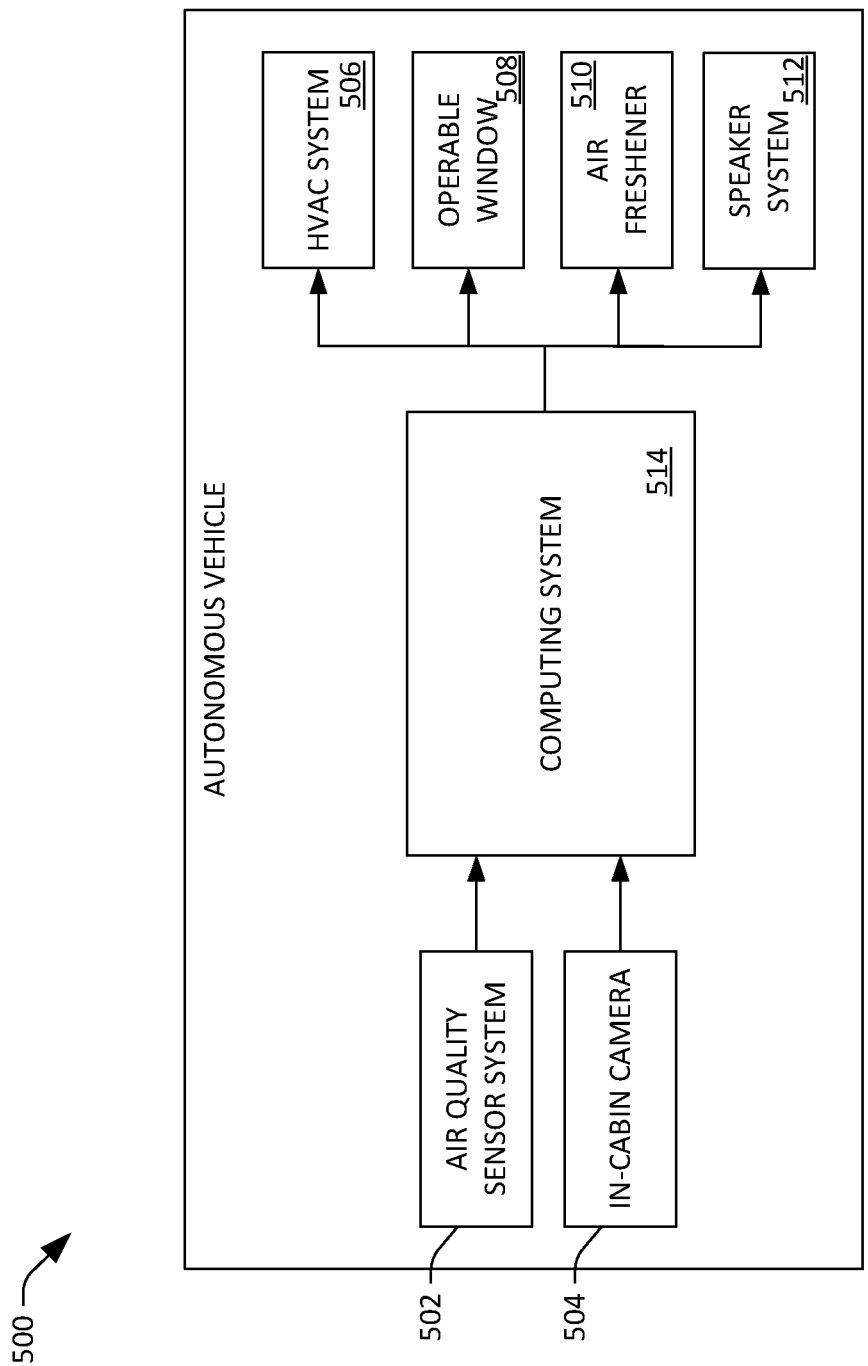
FIG. 5 illustrates an exemplary autonomous vehicle.

With reference now to FIG. 5, an exemplary autonomous vehicle 500 (e.g., the autonomous vehicle 100) is illustrated. The autonomous vehicle 500 includes an air quality sensor system 502 (e.g., the air quality sensor system 124) and an in-cabin camera 504 (e.g., the in-cabin camera 126) configured to sense an interior environment of the cabin of the autonomous vehicle 500 and output a sensor signal having data that corresponds to an item disposed in the cabin of the autonomous vehicle 500. For example, the in-cabin camera 504 may output a sensor signal indicative of a gym bag disposed within the cabin of the autonomous vehicle 500, whereas the air quality sensor system 502 may output a sensor signal based upon detection of $C_7H_{16}OS$, which can correspond to sweaty clothing within the gym bag. Thus, the sensor signal output by either the in-cabin camera 504 or the air quality sensor system 502 may correspond to a same item in the cabin generating a malodor.

The autonomous vehicle 500 includes a computing system 514 (e.g., the computing system 112) configured to receive the sensor signals from the air quality sensor system 502 and the in-cabin camera 504. The computing system 514 can further include systems and modules that provide similar functionality to the systems and modules incorporated in the computing system 112 of the autonomous vehicle 100. In addition, the computing system 514 is in communication with a plurality of remediation systems including, but not limited to, an HVAC system 506 (e.g., the HVAC system 128), an operable window 508 (e.g., the operable window 130), an air freshener 510 (e.g., the air freshener 132), and a speaker system 512. The speaker system 512 can remediate malodors by providing reminders to passengers of the autonomous vehicle 500 to remove items such as food, trash, debris, etc. when they exit the autonomous vehicle 500.

Moreover, the computing system 514 is configured to determine a type of an item (e.g., gym bag/sweaty clothing) disposed in the cabin of the autonomous vehicle 500 from the data provided by the sensor signal. When the type of the item is indictive of malodor, the computing system 514 identifies a remedial measure based upon the type of the item, wherein the remedial measure is selected to mitigate the malodor in the cabin of the autonomous vehicle 500. For example, a remedial measure for malodor caused by sweaty clothing within a gym bag may be to control the speaker system 512 of the autonomous vehicle to provide a request to a passenger at the conclusion of their trip to remove the gym bag from the cabin upon exiting the autonomous vehicle 500. In contrast, a remedial measure for a tipped over food container that is, for example identified by the in-cabin camera 504, may be to control the HVAC system 506, the operable window 508, or the air freshener 512. Accordingly, a remedial measure can be executed by the computing system 514 by controlling the remediation systems 506-512 based upon the source of a malodor and/or the type of an item identified in the cabin.

Figure 6:
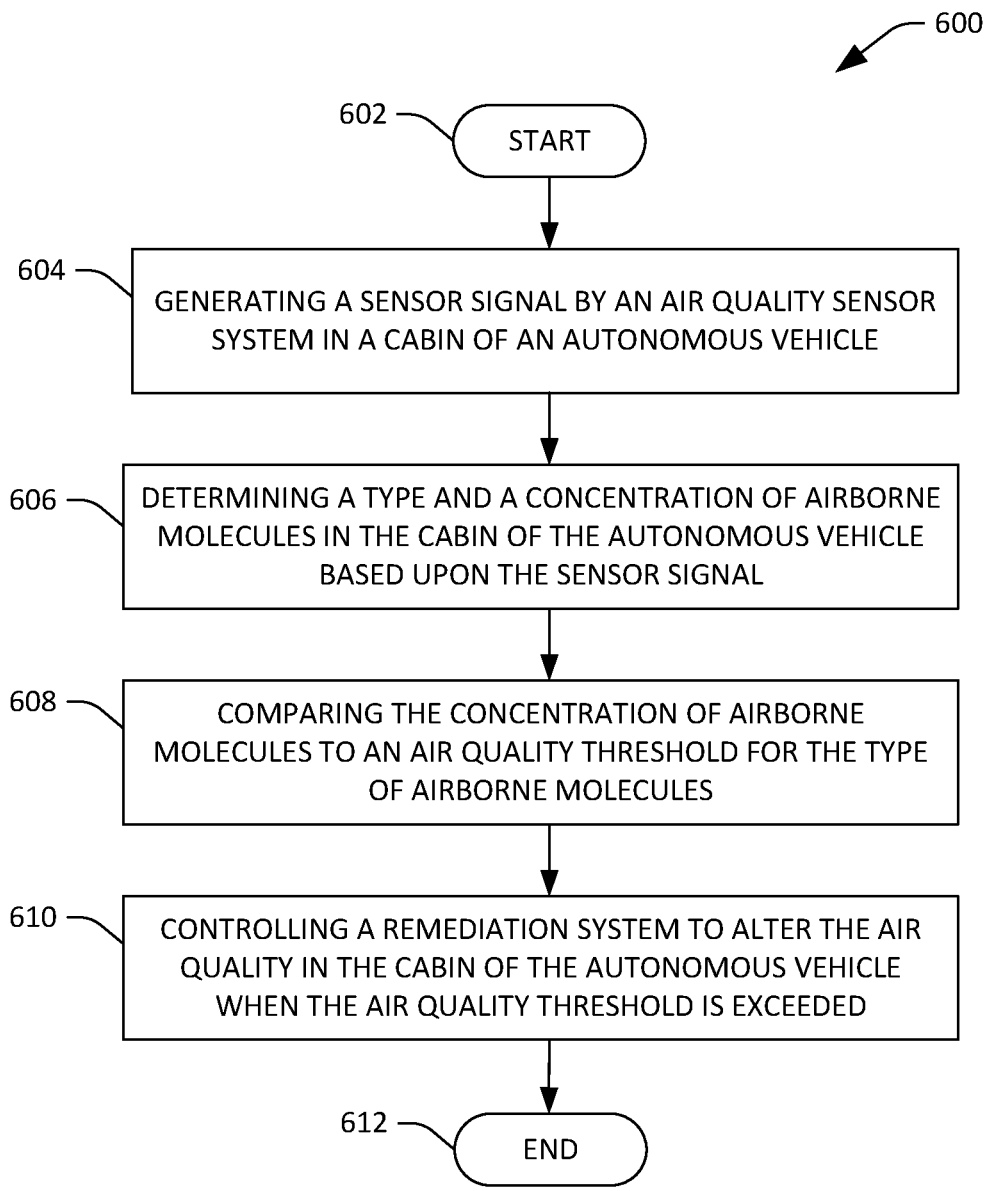
FIG. 6 is a flow diagram illustrating an exemplary methodology for controlling a remediation system to reduce a concentration of airborne molecules within a cabin of an autonomous vehicle.
Figure 7:
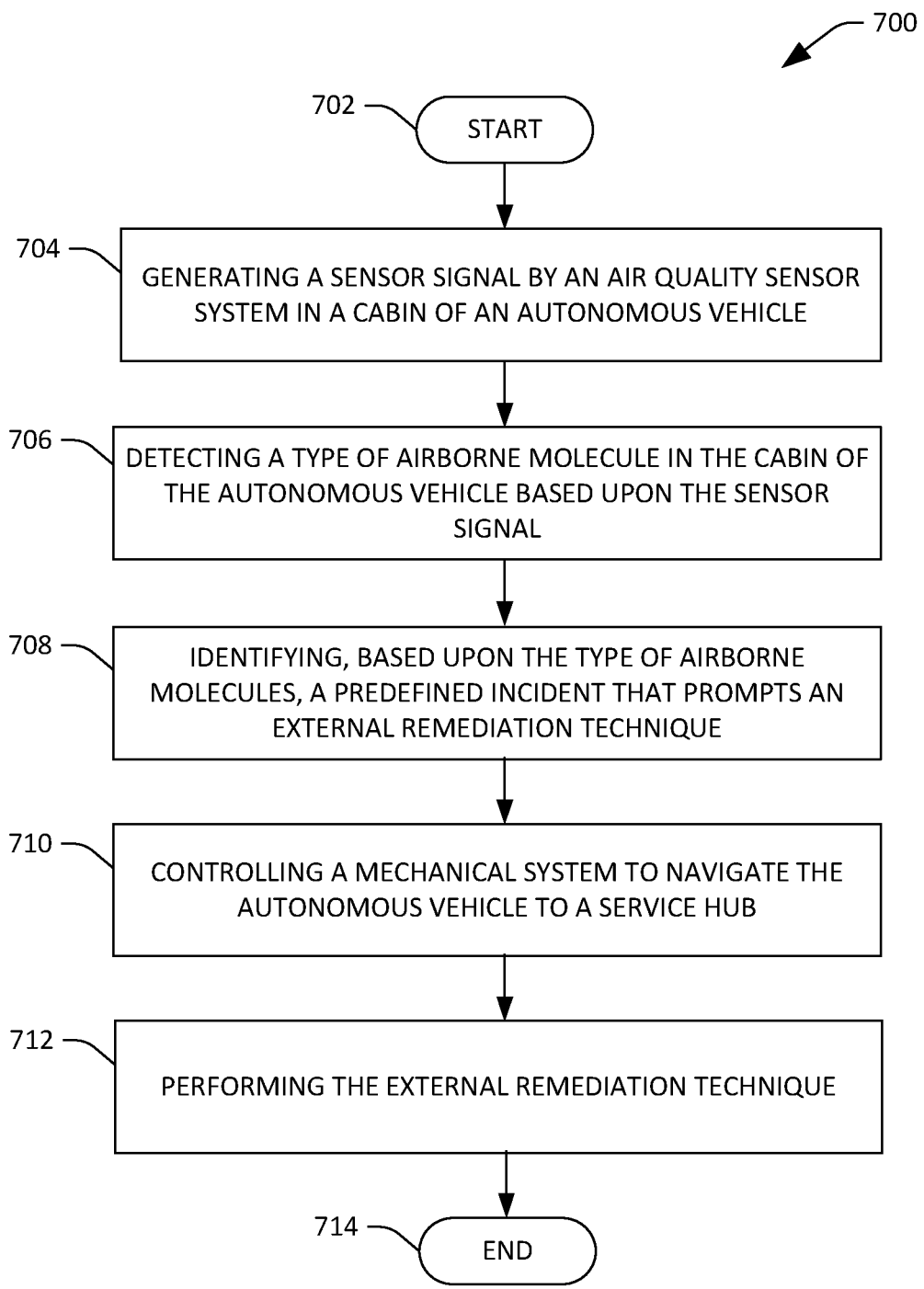
FIG. 7 is a flow diagram illustrating an exemplary methodology for dispatching an autonomous vehicle to a service hub where external remediation is performed.

FIGS. 6 and 7 illustrate exemplary methodologies relating to malodor detection and remediation. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for malodor detection and remediation is illustrated. The methodology 600 starts at 602, and at 604 a sensor signal is generated by an air quality sensor system in a cabin of an autonomous vehicle. The air quality sensor system can include sensors, such as VOC sensors or $H_2S$ sensors, configured to detect airborne molecules indicative of malodor. At 606, a type and a concentration of airborne molecules in the cabin of the autonomous vehicle is determined based the sensor signal, for example, by a computing system of the autonomous vehicle. At 608, the concentration of airborne molecules is comparted to an air quality threshold for the type of airborne molecules. The air quality threshold may be dependent upon the type of molecule included in the concentration of airborne molecules, wherein different types of molecules may be linked to different air quality thresholds. At 610, a remediation system is controlled (e.g., by the computing system) to alter the air quality in the cabin of the autonomous vehicle when the concentration of airborne molecules exceeds the air quality threshold. The remediation system can include, for example, any of an operable window, an HVAC system, or an air freshener. The methodology 600 completes at 612.

Referring now to FIG. 7, an exemplary methodology 700 is illustrated for dispatching an autonomous vehicle to a service hub based upon detection of a malodor. The methodology 700 starts at 702, and at 704 a sensor signal is generated by an air quality sensor system in a cabin of the autonomous vehicle. The air quality sensor system can include sensors, such as VOC sensors or $H_2S$ sensors, configured to detect airborne molecules indicative of malodor. At 706, a type of airborne molecule in the cabin of the autonomous vehicle is detected based upon the sensor signal, for example, by a computing system of the autonomous vehicle that receives the sensor signal and determines the type of airborne molecule captured therein. At 708, a predefined incident is identified based upon the type of airborne molecule, wherein the predefined incident prompts an external remediation technique, such as cleaning routines, sanitation, trash/item removal, maintenance, interior refurbishing, etc., to mitigate the type of airborne molecule from the cabin of the autonomous vehicle. At 710, a mechanical system of the autonomous vehicle is controlled by to navigate the autonomous vehicle to a service hub where, at 712, the external remediation technique is performed. The methodology 700 completes at 714.

Figure 8:
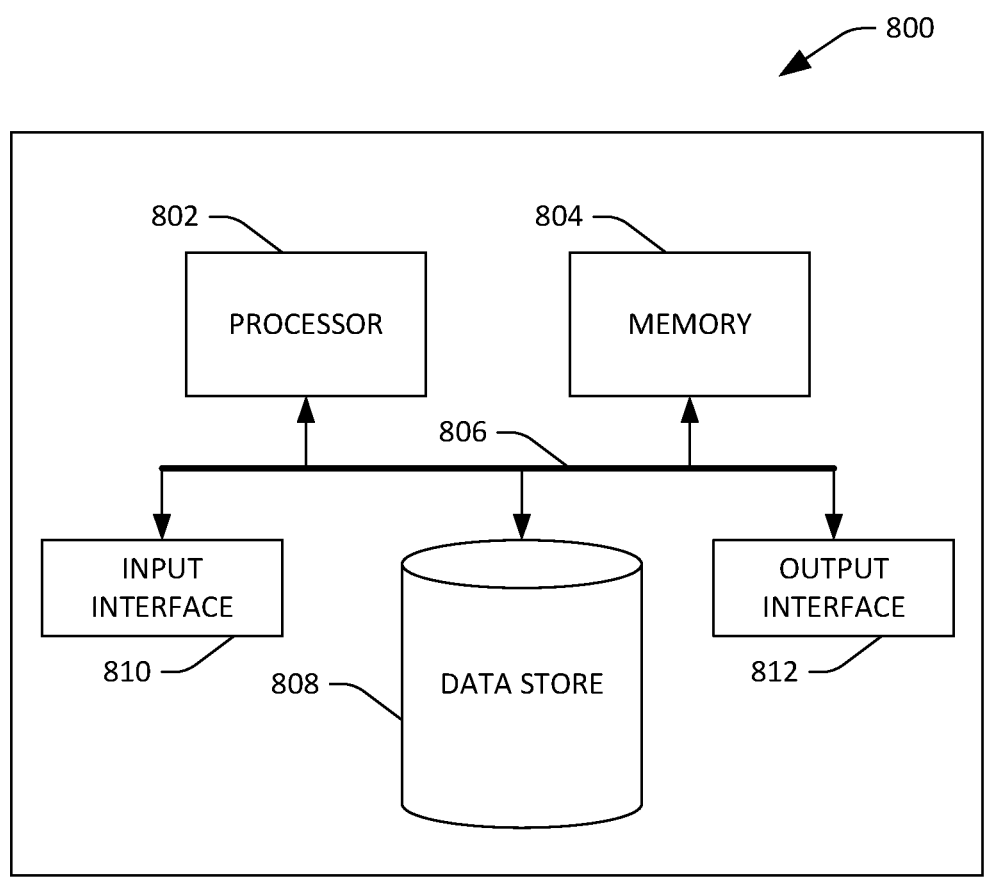
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the computing system 112. The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. In addition to storing executable instructions, the memory 804 may also store location information, distance information, direction information, etc.

The computing device 800 additionally includes a data store 808 that is accessible by the processor 802 by way of the system bus 806. The data store 808 may include executable instructions, location information, distance information, direction information, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
 a remediation system configured to alter an air quality in
  a cabin of the autonomous vehicle;

an air quality sensor system configured to output a sensor signal indicative of a type and a concentration of airborne molecules in the cabin of the autonomous vehicle;

a computing system in communication with the remediation system and the air quality sensor system, wherein the computing system comprises:

a processor; and memory that stores instructions that, when executed by the processor, cause the processor to perform acts comprising:

determining the type and the concentration of airborne molecules in the cabin of the autonomous vehicle based upon the sensor signal;

determining whether the type and the concentration of airborne molecules are indicative of a predefined incident type responsive to which the autonomous vehicle is to navigate to a service hub for malodor remediation;

comparing the concentration of airborne molecules to an air quality threshold for the type of airborne molecules; and when the concentration of airborne molecules exceeds the air quality threshold and when the type and the concentration of airborne molecules are not indicative of the predefined incident type:

determining a timeframe of operation for the remediation system while the autonomous vehicle is vacant and travels to pick up a next passenger for a ride in the autonomous vehicle, the timeframe of operation for the remediation system being determined based upon the concentration of airborne molecules in the cabin, an anticipated remaining time while the autonomous vehicle travels to pick up the next passenger for the ride in the autonomous vehicle, and the type of the airborne molecules in the cabin; and controlling the remediation system to alter the air quality in the cabin of the autonomous vehicle during the timeframe of operation.

2. The autonomous vehicle of claim 1, wherein controlling the remediation system to alter the air quality in the cabin of the autonomous vehicle further comprises controlling a heating, ventilating, and air conditioning (HVAC) system.

3. The autonomous vehicle of claim 1, wherein controlling the remediation system to alter the air quality in the cabin of the autonomous vehicle further comprises controlling an operable window.

4. The autonomous vehicle of claim 1, wherein controlling the remediation system to alter the air quality in the cabin of the autonomous vehicle further comprises controlling an air freshener.

5. The autonomous vehicle of claim 1, wherein the timeframe of operation for the remediation system is further determined based upon power consumption by the remediation system.

6. The autonomous vehicle of claim 1, wherein the remediation system is operated based upon an input from a passenger.

7. The autonomous vehicle of claim 1, wherein the remediation system is controlled based upon at least one of cabin size, cabin temperature, cabin ventilation, distance of the air quality sensor system from a source of airborne molecules, molecular combinations detected by the air quality sensor system, and the concentration of the airborne molecules.

8. The autonomous vehicle of claim 1, wherein the memory further stores instructions, that when executed by the processor, cause the processor to perform acts comprising:

detecting a source of airborne molecules based upon an image of the cabin of the autonomous vehicle captured by a camera sensor system.

9. The autonomous vehicle of claim 1, wherein the computing system of the autonomous vehicle provides cabin tidiness metrics to a server computing system that are based upon a condition of the autonomous vehicle following passenger transit, and wherein the server computing system generates a rider rating for a passenger based upon the tidiness metrics.

10. The autonomous vehicle of claim 1, wherein the air quality sensor system comprises an array of sensors, the array of sensors comprising:

a first sensor configured to detect a volatile organic compound; and a second sensor configured to detect hydrogen sulfide.

11. An autonomous vehicle comprising:

a speaker system;

a remediation system;

a camera and an air quality sensor system configured to output sensor signals, wherein the sensor signals include data that corresponds to an item in a cabin of the autonomous vehicle;

a computing system in communication with the remediation system and configured to receive the sensor signals from the camera and the air quality sensor system, wherein the computing system comprises:

a processor; and memory that stores instructions that, when executed by the processor, cause the processor to perform acts comprising:

determining a type of the item in the cabin of the autonomous vehicle based upon the sensor signals, wherein the type of the item is indicative of a malodor;

identifying a location of the item within the cabin of the autonomous vehicle based upon the sensor signals;

based on the type of the item, controlling the speaker system to output an audible request for a first passenger to remove the item when the first passenger exits the autonomous vehicle;

subsequent to the first passenger exiting the autonomous vehicle, identifying a remedial measure selected to mitigate the malodor in the cabin of the autonomous vehicle based upon the type of the item;

determining an operating timeframe for the remediation system to execute the remedial measure while the autonomous vehicle is vacant and travels to pick up a next passenger for a ride in the autonomous vehicle, the operating timeframe for the remediation system being determined based on an anticipated remaining time while the autonomous vehicle travels to pick up the next passenger for the ride in the autonomous vehicle and the location of the item within the cabin of the autonomous vehicle; and controlling the remediation system to execute the remedial measure during the operating timeframe.

12. The autonomous vehicle of claim 11, the remediation system comprises:
- a heating, ventilating, and air conditioning (HVAC) system;
- a window; and
- an air freshener;
- wherein the remedial measure comprises at least one selected operation of one or more of the HVAC system, the window, or the air freshener; and
- wherein controlling the remediation system to execute the remedial measure during the operating timeframe further comprises controlling the one or more of the HVAC system, the window, or the air freshener to perform the at least one selected operation during the operating timeframe.

13. The autonomous vehicle of claim 11, wherein the sensor signals further include data indicative of the type of the item in the cabin of the autonomous vehicle and a concentration of airborne molecules in the cabin of the autonomous vehicle due to the item being in the cabin of the autonomous vehicle.

14. A method of operating an autonomous vehicle, comprising:
- receiving, from an air quality sensor system of the autonomous vehicle, a sensor signal indicative of a type and a concentration of airborne molecules in a cabin of the autonomous vehicle;
- determining whether the type and the concentration of airborne molecules are indicative of a predefined incident type responsive to which the autonomous vehicle is to navigate to a service hub for malodor remediation;
- comparing the concentration of airborne molecules to an air quality threshold for the type of airborne molecules; and
- when the concentration of airborne molecules exceeds the air quality threshold and when the type and the concentration of airborne molecules are not indicative of the predefined incident type:
  - determining a timeframe of operation for a remediation system of the autonomous vehicle while the autonomous vehicle is vacant and travels to pick up a next passenger for a ride in the autonomous vehicle, the timeframe of operation for the remediation system being determined based upon the concentration of airborne molecules in the cabin, an anticipated remaining time while the autonomous vehicle travels to pick up the next passenger for the ride in the autonomous vehicle, and the type of the airborne molecules in the cabin; and
  - controlling the remediation system to alter the air quality in the cabin of the autonomous vehicle during the timeframe of operation.

15. The method of claim 14, wherein the remediation system is controlled based on cabin size.

16. The method of claim 14, wherein the remediation system is controlled based on cabin temperature.

17. The method of claim 14, wherein the remediation system is controlled based on cabin ventilation.

18. The method of claim 14, wherein the remediation system is controlled based on distance of the air quality sensor system from a source of airborne modules.

19. The method of claim 14, wherein the remediation system is controlled based on a molecular combination detected by the air quality sensor system.

20. The method of claim 14, wherein the remediation system comprises:
- a heating, ventilating, and air conditioning HVAC) system;
- a window; and
- an air freshener.

* * * * *